(12) United States Patent
Li et al.

(10) Patent No.: US 8,582,050 B2
(45) Date of Patent: Nov. 12, 2013

(54) BACKLIGHT MODULE AND LIQUID CRYSTAL DISPLAY

(75) Inventors: Quan Li, Shenzhen (CN); Yu-chun Hsiao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 68 days.

(21) Appl. No.: 13/377,544

(22) PCT Filed: Oct. 27, 2011

(86) PCT No.: PCT/CN2011/081429
§ 371 (c)(1),
(2), (4) Date: Dec. 10, 2011

(87) PCT Pub. No.: WO2013/020327
PCT Pub. Date: Feb. 14, 2013

(65) Prior Publication Data
US 2013/0033657 A1 Feb. 7, 2013

(30) Foreign Application Priority Data
Aug. 5, 2011 (CN) ...................... 2011 2 0284241 U

(51) Int. Cl.
*G02F 1/1333* (2006.01)
(52) U.S. Cl.
USPC ........................................................ 349/58
(58) Field of Classification Search
USPC ...................................... 349/58, 65
See application file for complete search history.

(56) References Cited

U.S. PATENT DOCUMENTS 5,666,172 A * 9/1997 Ida et al. .......................... 349/58
8,154,682 B2 * 4/2012 Arihara ........................... 349/60

FOREIGN PATENT DOCUMENTS

| CN | 1892360 A | 1/2007 |
| CN | 101476687 A | 7/2009 |
| CN | 101737735 A | 6/2010 |
| JP | 2006126583 A | 5/2006 |

OTHER PUBLICATIONS

International Search Report of the PCT Application No. PCT/CN2011/081429.

* cited by examiner

*Primary Examiner* — James Dudek

(57) ABSTRACT

A backlight module comprises a back frame, a light guide plate disposed in the back frame, and elastic corner parts for locating the light guide plate. The elastic corner parts are disposed at diagonal corners of the backlight module and sandwiched between the back frame and the light guide plate. The elastic corner parts can locate the light guide plate in the back frame, and the desirable cushioning performance and appropriate hardness of the elastic corner parts provide a desirable space for thermal expansion and contraction of the light guide plate. Meanwhile, the elastic corner part corresponding to the light incident side is greater than that of the non-light-incident sides for ensuring the light mixing distance between the LEDs and the light incident side of the light guide plate, which can improve the light unitization factor of the LEDs and save both the product cost and the mold cost.

17 Claims, 3 Drawing Sheets

BACKLIGHT MODULE AND LIQUID CRYSTAL DISPLAY

BACKGROUND

1. Technical Field

The present disclosure relates to the technical field of liquid crystal displays (LCDs), and more particularly, to a backlight module and an LCD.

2. Description of Related Art

As consumers' demands for energy-saving and environment-friendly products increase, LCDs adopting light emitting diodes (LEDs) as a backlight source have gradually become the mainstream product in the display market.

Currently, LED light sources in backlight modules of the LCDs are primarily divided into two types: the edge-lit type and the direct-lit type. In an LED backlight module of the edge-lit type, a PMMA (polymethyl methacrylate) light guide plate (LGP) needs to be used. Because of thermal expansion and contraction of the light guide plate and because the light mixing distance of the LEDs must be considered, it is difficult to precisely determine a gap between the light guide plate and the plastic frame and the back frame. Specifically, if the gap is too small, the light guide plate tends to warp due to an insufficient space for thermal expansion and contraction, and this would compromise the aesthetic appearance and the displaying effect of the LCD; and otherwise, if the gap is too large, then the light guide plate tends to sway in the backlight module, which might cause noises and is unfavorable for a narrow side-frame design of the LCD.

Meanwhile, in order to promote the idea of saving energy and reducing carbon dioxide emission and to reduce the cost, the number of parts used in the backlight module shall be minimized as far as possible. Accordingly, an ultra-slim design has become a development tendency for the LCDs.

BRIEF SUMMARY

The primary objective of the present disclosure is to provide a backlight module and an LCD having an optimized structure and capable of improving light utilization factor of LEDs.

To achieve the aforesaid objective, the present disclosure provides a backlight module, which comprises a back frame, a light guide plate disposed in the back frame and elastic corner parts for locating the light guide plate. The elastic corner parts are disposed at diagonal corners of the backlight module and sandwiched between the back frame and the light guide plate, and the elastic corner parts are fixedly connected with the back frame.

Preferably, the back frame comprises a baseplate and sidewalls, and the light guide plate is located above the baseplate of the back frame. Each of the elastic corner parts comprises two sidewalls perpendicular to each other, and outer surfaces of the two sidewalls abut on the sidewalls of the back frame. A supporting plate extends inwards perpendicularly from a middle portion of an inner surface of each of the two sidewalls to divide the inner surfaces of the two sidewalls into an upper layer and a lower layer. The inner surfaces of the lower layer abut on a side surface of the light guide plate. A lower surface of the supporting plate abuts on an upper surface of the light guide plate.

Preferably, the elastic corner parts are made of a plastic material, a silica gel or a rubber material.

Preferably, the backlight module further comprises an LCD panel supported on an upper surface of the supporting plate. The inner surfaces of the upper layer form a stopping surface for locating the LCD panel.

Preferably, the backlight module further comprises an optical film located above the light guide plate. The supporting plate is in an L-shape having four continuous outer end surfaces, and two of the outer end surfaces in the middle are perpendicular to each other to form an L-shaped snap-fit groove and two of the outer end surfaces near the edge are perpendicular to each other. Any two of the outer end surfaces perpendicular to each other serve to locate corresponding corners of the optical film.

Preferably, the number of the elastic corner parts is four, and the four elastic corner parts are disposed at four diagonal corners of the backlight module symmetrically.

Preferably, the backlight module further comprises an LED lamp strip. Side surfaces of the light guide plate comprises a light incident side and a non-light-incident side. A light emitting surface of the LED lamp strip is disposed opposite to the light incident side of the light guide plate. A hardness of the elastic corner part corresponding to the light incident side is greater than a hardness of the elastic corner parts corresponding to the non-light-incident sides. The upper surface of the light guide plate is a light exiting surface.

Preferably, the elastic corner parts are adhered to the back frame through use of a double-sided adhesive tape or through snap-fitting connection.

Preferably, the backlight module further comprises a reflective sheet located between the baseplate of the back frame and the light guide plate.

Preferably, the backlight module further comprises a front frame and a cushion. The front frame is located above the LCD panel and fixedly connected with the sidewalls of the back frame. The cushion is located between the front frame and the LCD panel.

The present disclosure further provides a backlight module, which comprises a back frame and a light guide plate disposed in the back frame and further comprises elastic corner parts for locating the light guide plate. The elastic corner parts are disposed at diagonal corners of the backlight module and sandwiched between the back frame and the light guide plate.

Preferably, the back frame comprises a baseplate and sidewalls. The light guide plate is located above the baseplate of the back frame. The elastic corner parts are made of a plastic material, a silica gel or a rubber material. Each of the elastic corner parts comprises two sidewalls perpendicular to each other, and outer surfaces of the two sidewalls abut on the sidewalls of the back frame. A supporting plate extends inwards perpendicularly from a middle portion of an inner surface of each of the two sidewalls to divide the inner surfaces of the two sidewalls into an upper layer and a lower layer, and the inner surfaces of the lower layer abut on a side surface of the light guide plate. A lower surface of the supporting plate abuts on an upper surface of the light guide plate.

Preferably, the backlight module further comprises an LCD panel supported on an upper surface of the supporting plate. The inner surfaces of the upper layer form a stopping surface for locating the LCD panel.

Preferably, the backlight module further comprises an optical film located above the light guide plate. The supporting plate is in an L-shape having four continuous outer end surfaces, and two of the outer end surfaces in the middle are perpendicular to each other to form an L-shaped snap-fit groove and two of the outer end surfaces near the edge are perpendicular to each other. Any two of the outer end surfaces perpendicular to each other serve to locate corresponding corners of the optical film.

Preferably, the number of the elastic corner parts is four, and the four elastic corner parts are disposed at four diagonal corners of the backlight module symmetrically.

Preferably, the backlight module further comprises an LED lamp strip. Side surfaces of the light guide plate comprises a light incident side and a non-light-incident side. A light emitting surface of the LED lamp strip is disposed opposite to the light incident side of the light guide plate. A hardness of the elastic corner part corresponding to the light incident side is greater than a hardness of the elastic corner parts corresponding to the non-light-incident sides. The upper surface of the light guide plate is a light exiting surface.

Preferably, the backlight module further comprises a reflective sheet located between the baseplate of the back frame and the light guide plate.

Preferably, the backlight module further comprises a front frame and a cushion. The front frame is located above the LCD panel and fixedly connected with the sidewalls of the back frame. The cushion is located between the front frame and the LCD panel.

The present disclosure further provides an LCD, which comprises a backlight module. The backlight module comprises a back frame, a light guide plate disposed in the back frame and elastic corner parts for locating the light guide plate. The elastic corner parts are disposed at diagonal corners of the backlight module and sandwiched between the back frame and the light guide plate.

Preferably, the back frame comprises a baseplate and sidewalls. The light guide plate is located above the baseplate of the back frame. The elastic corner parts are made of a plastic material, a silica gel or a rubber material. Each of the elastic corner parts comprises two sidewalls perpendicular to each other, and outer surfaces of the two sidewalls abut on the sidewalls of the back frame. A supporting plate extends inwards perpendicularly from a middle portion of an inner surface of each of the two sidewalls to divide the inner surfaces of the two sidewalls into an upper layer and a lower layer, and the inner surfaces of the lower layer abut on a side surface of the light guide plate. A lower surface of the supporting plate abuts on an upper surface of the light guide plate.

According to the backlight module and the LCD of the present disclosure, the elastic corner parts are disposed at diagonal corners of the backlight module to locate the light guide plate in the back frame, and the desirable cushioning performance and appropriate hardness of the elastic corner parts are utilized to provide a desirable space for thermal expansion and contraction of the light guide plate. Meanwhile, by making a hardness of the elastic corner part corresponding to the light incident side of the light guide plate greater than that of the elastic corner parts corresponding to the non-light-incident sides, the light mixing distance between the LEDs and the light incident side of the light guide plate is ensured, which can improve the light unitization factor of the LEDs and quality of the LCD panel. Moreover, by using the elastic corner parts to locate the LCD panel and the optical film disposed above the light guide plate, use of the plastic frame as in the prior art can be eliminated to save both the product cost and the mold cost.

Hereinafter, implementations, functional features and advantages of the present disclosure will be further described with reference to embodiments thereof and the attached drawings.

DETAILED DESCRIPTION

Hereinbelow, the present disclosure will be further described with reference to the attached drawings and embodiments thereof. It shall be understood that, the embodiments described herein are only intended to illustrate but not to limit the present disclosure.

Figure 1:
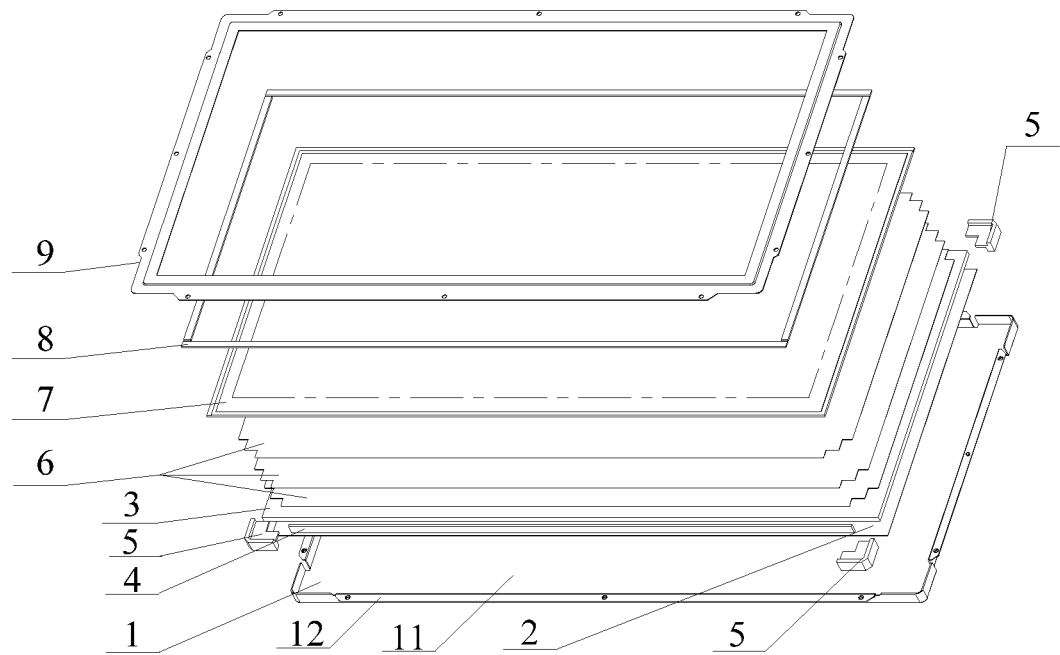
FIG. 1 is a schematic exploded structural view of a first embodiment of a backlight module according to the present disclosure.
Figure 2:
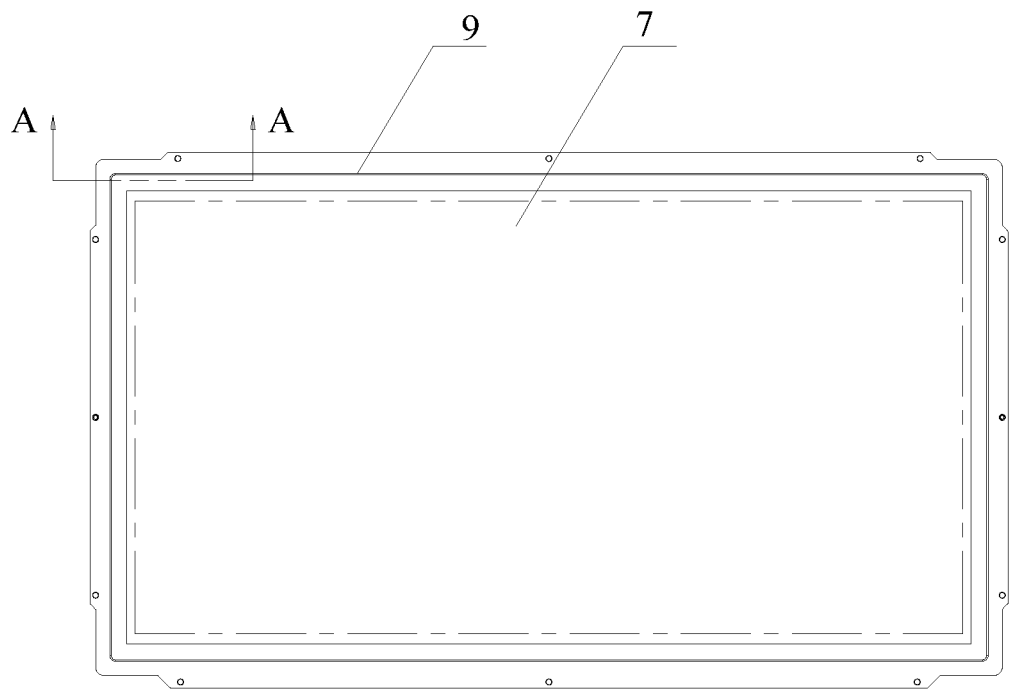
FIG. 2 is a top view of the first embodiment of the backlight module according to the present disclosure.
Figure 3:
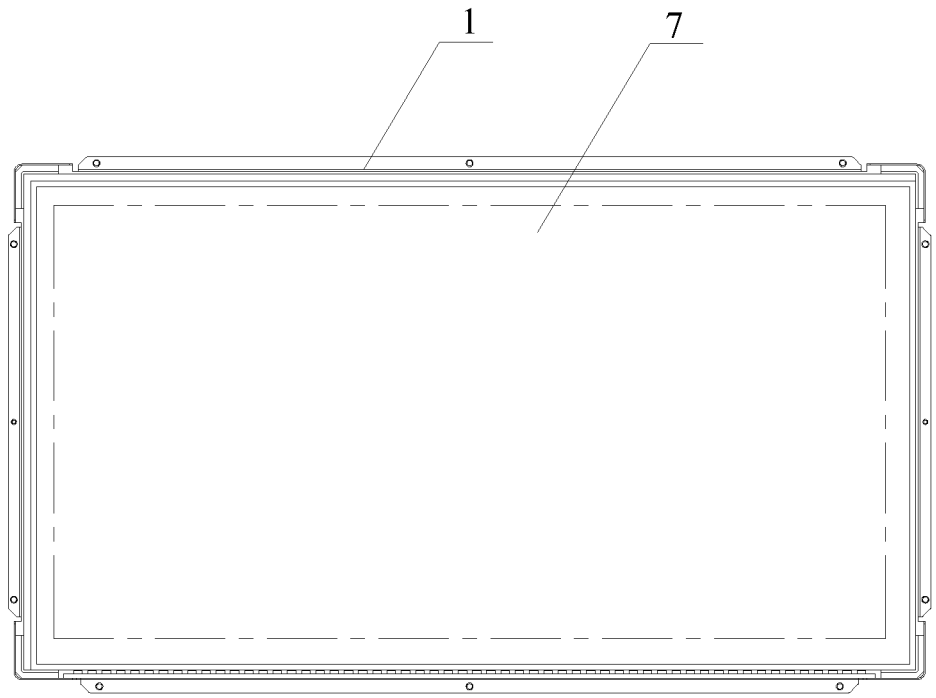
FIG. 3 is a top view of the first embodiment of the backlight module according to the present disclosure with a front frame thereof being removed.
Figure 4:
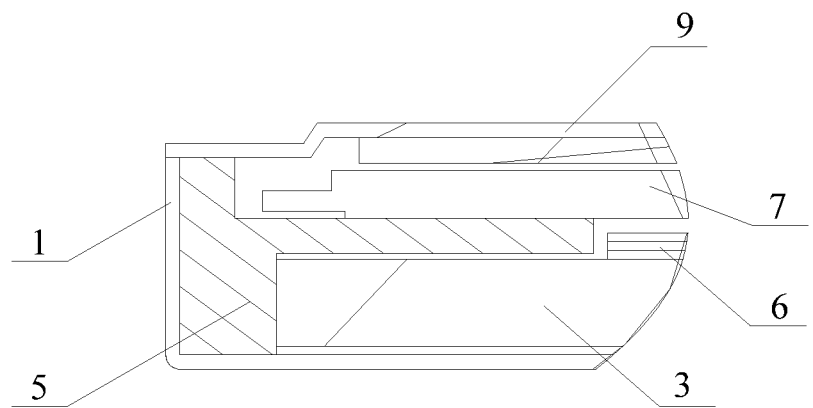
FIG. 4 is a schematic enlarged cross-sectional view taken along a line A-A shown in FIG. 2.

Referring to FIG. 1 to FIG. 4, FIG. 1 is a schematic exploded structural view of a first embodiment of a backlight module according to the present disclosure, FIG. 2 is a top view of the first embodiment of the backlight module according to the present disclosure, FIG. 3 is a top view of the first embodiment of the backlight module according to the present disclosure with a front frame thereof being removed, and FIG. 4 is a schematic enlarged cross-sectional view taken along a line A-A shown in FIG. 2. The backlight module according to the first embodiment of the present disclosure is an LED backlight module of the edge-lit type, which comprises a back frame 1, a light guide plate 3 disposed in the back frame 1, an LED lamp strip 4, a reflective sheet 2 located between the light guide plate 3 and the back frame 1, an optical film 6 located above the light guide plate 3, an LCD panel 7, a cushion 8 and a front frame 9. A light emitting surface of the LED lamp strip 4 is disposed opposite to a light incident side of the light guide plate 3, and the cushion 8 is disposed between the front frame 9 and the LCD panel 7. At diagonal corners of the backlight module are disposed elastic corner parts 5 for locating the light guide plate 3, the optical film 6 and the LCD panel 7, and the elastic corner parts 5 are sandwiched between the back frame 1 and the light guide plate 3.

In detail, the back frame 1 comprises a baseplate 11 and sidewalls 12, and the front frame 9 is fixedly connected with the sidewalls 12 of the back frame 1.

The light guide plate 3 is located above the baseplate 11 of the back frame 1. The light guide plate 3 comprises a side surface, a bottom surface and a light exiting surface (not shown) disposed opposite to the bottom surface. Side surfaces of the light guide plate 3 comprises the light incident side and a non-light-incident side, and the light incident side is disposed opposite to the light emitting surface of the LED lamp strip 4.

Figure 5:
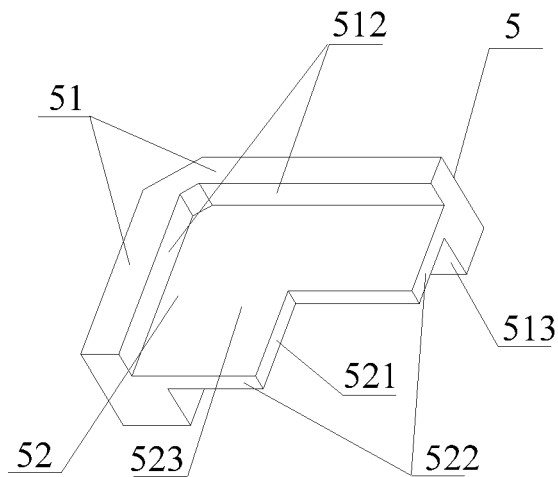
FIG. 5 is a schematic front perspective structural view of an elastic corner part in the first embodiment of the backlight module according to the present disclosure.
Figure 6:
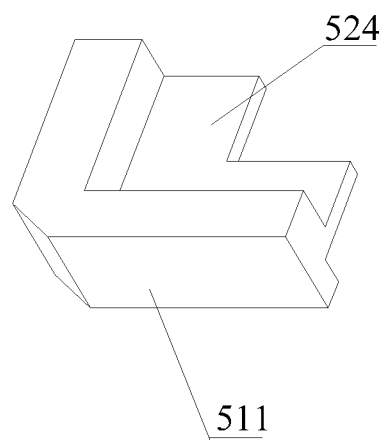
FIG. 6 is a schematic back perspective structural view of the elastic corner part in the first embodiment of the backlight module according to the present disclosure.

In this embodiment, the elastic corner parts 5 are disposed at four diagonal corners of the backlight module respectively. The elastic corner parts 5 are preferably made of a silica gel or a rubber material and may also be made of a polymer plastic material with good flexibility, and are required to have desirable cushioning performance and a certain level of hardness. Referring to FIG. 5 and FIG. 6 together, FIG. 5 is a schematic front perspective structural view of an elastic corner part in an embodiment of the backlight module according to the present disclosure, and FIG. 6 is a schematic back perspective structural view of the elastic corner part in the embodiment of the backlight module according to the present disclosure. In this embodiment, each of the elastic corner parts 5 comprises two sidewalls 51 perpendicular to each other. Outer surfaces 511 of the two sidewalls 51 of each of the elastic corner parts 5 abut on the sidewalls 12 of the back frame 1; and a supporting plate 52 extends inwards perpendicularly from a middle portion of an inner surface of each of the two sidewalls 5. An upper surface of 523 of the supporting plate 52 is used to support the LCD panel 7, and a lower surface 524 of the supporting plate 52 abuts on an upper surface of the light guide plate 3. In this embodiment, the upper surface of the light guide plate 3 is just the light exiting surface of the light guide plate 3.

Meanwhile, the supporting plate 52 divides the inner surfaces of the two sidewalls 51 of each of the elastic corner parts 5 into an upper layer and a lower layer. Inner surfaces 513 of the lower layer abut on the side surface of the light guide plate 3 and inner surfaces 512 of the upper layer form a stopping surface for locating the LCD panel 7.

Furthermore, in this embodiment, the supporting plate 52 is designed to be of an L-shape to match with corners of the optical film 6, and the supporting plate 52 of the L-shape has four continuous outer end surfaces. Two of the outer end surfaces 521 in the middle are perpendicular to each other to form an L-shaped snap-fit groove, and two of the outer end surfaces 522 near the edge are perpendicular to each other. Any two of the four outer end surfaces 521 and 522 of the supporting plate 52 that are perpendicular to each other can serve to locate corresponding corners of the optical film 6, and which two of the four outer end surfaces 521 and 522 are used depends on the shape of the corners of the optical film 6. For example, if the optical film 6 has right-angle corners protruding outwards, the two outer end surfaces of the supporting plate 52 in the middle may be used to form the L-shaped snap-fit groove to locate the corresponding corner of the optical film 6; and if the optical film 6 has right-angle corners concaved inwards, the two outer end surfaces 522 near the edge may be used to locate the corresponding corner of the optical film 6.

In the aforesaid structures, the elastic corner parts 5 are not only used to locate the light guide plate 3 and the optical film 6 but also used to support and locate the LCD panel 7 in place of the plastic frame used in the prior art, so the plastic frame can be eliminated to save both the material cost and the mold cost.

Furthermore, in order to prevent deformation of the light guide plate 3 due to thermal expansion and contraction when being thermally illuminated by LEDs and also to improve light utilization factor of the LEDs by guaranteeing the light mixing distance between the LEDs and the light incident side of the light guide plate 3, the elastic corner parts 5 may be made of a silica gel or a rubber material with elasticity or a polymer plastic material with desirable flexibility in this embodiment so as to impart the elastic corner parts 5 with desirable cushioning performance. Moreover, a hardness of the elastic corner part corresponding to the light incident side and that of the elastic corner parts corresponding to the non-light-incident sides of the light guide plate 3 may be adjusted to make the hardness of the elastic corner part corresponding to the light incident side of the light guide plate 3 greater than that of the elastic corner parts corresponding to the non-light-incident sides. As the elastic corner part 5 with a greater hardness can be compressed to a smaller extent, the light guide plate 3 will preferentially expand to the non-light-incident side when being heated.

The elastic corner parts 5 are fixedly connected with the back frame 1. Specifically, the elastic corner parts 5 may be adhered to the back frame 1 through a double-sided adhesive tape or be connected with the back frame 1 through snap-fitting connection. For example, catches may be disposed on the elastic corner parts 5 respectively and buckles may be disposed on the back frame 1, and the catches can cooperate with the buckles to fix the elastic corner parts 5 on the back frame 1; and alternatively, the buckles may be disposed on the elastic corner parts 5 and the catches may be disposed on the back frame 1, and the catches cooperate with the buckles to fix the elastic corner parts 5 on the back frame 1.

In this embodiment, the cushion 8 is disposed between the front frame 9 and the LCD panel 7 to improve the stability of the backlight module and to reduce the impact of the external force.

According to this embodiment, the elastic corner parts 5 are disposed at diagonal corners of the backlight module to locate the light guide plate 3 in the back frame 1, and the desirable cushioning performance and appropriate hardness of the elastic corner parts 5 are utilized to provide a desirable space for thermal expansion and contraction of the light guide plate 3. Meanwhile, by making a hardness of the elastic corner part 5 corresponding to the light incident side of the light guide plate 3 greater than that of the elastic corner parts 5 corresponding to the non-light-incident sides, the light mixing distance between the LEDs and the light incident side of the light guide plate 3 is ensured, which can improve the light unitization factor of the LEDs and quality of the LCD panel 7 to further improve the displaying effect of the LCD. Moreover, by using the elastic corner parts 5 to locate the LCD panel 7 and the optical film 6 disposed above the light guide plate 3, use of the plastic frame as in the prior art can be eliminated to save both the product cost and the mold cost.

In addition, an embodiment of the present disclosure further provides an LCD. The LCD comprises the backlight module described in the aforesaid embodiment, and no further descriptions will be made herein.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A backlight module, comprising a back frame and a light guide plate disposed in the back frame, wherein the backlight module further comprises elastic corner parts for locating the light guide plate, the elastic corner parts are disposed at diagonal corners of the backlight module and sandwiched between the back frame and the light guide plate; and the elastic corner parts are fixedly connected with the back frame;

wherein the back frame comprises a baseplate and sidewalls; the light guide plate is located above the baseplate of the back frame; each of the elastic corner parts comprises two sidewalls perpendicular to each other; outer surfaces of the two sidewalls abut on the sidewalls of the back frame; a supporting plate extends inwards perpendicularly from a middle portion of an inner surface of each of the two sidewalls to divide the inner surfaces of the two sidewalls into an upper layer and a lower layer; the inner surfaces of the lower layer abut on a side surface of the light guide plate; and a lower surface of the supporting plate abuts on an upper surface of the light guide plate.

2. The backlight module of claim 1, wherein the elastic corner parts are made of a plastic material, a silica gel or a rubber material.

3. The backlight module of claim 2, further comprising an LCD panel supported on an upper surface of the supporting plate, wherein the inner surfaces of the upper layer form a stopping surface for locating the LCD panel.

4. The backlight module of claim 3, further comprising an optical film located above the light guide plate, wherein the supporting plate is in an L-shape having four continuous outer end surfaces, two of the outer end surfaces in the middle are perpendicular to each other to form an L-shaped snap-fit groove and two of the outer end surfaces near the edge are perpendicular to each other, and any two of the outer end surfaces perpendicular to each other serve to locate corresponding corners of the optical film.

5. The backlight module of claim 4, wherein the number of the elastic corner parts is four, and the four elastic corner parts are disposed at four diagonal corners of the backlight module symmetrically.

6. The backlight module of claim 5, further comprising an LED lamp strip, wherein side surfaces of the light guide plate comprises a light incident side and a non-light-incident side, a light emitting surface of the LED lamp strip is disposed opposite to the light incident side of the light guide plate; a hardness of the elastic corner part corresponding to the light incident side is greater than a hardness of the elastic corner parts corresponding to the non-light-incident sides; and the upper surface of the light guide plate is a light exiting surface.

7. The backlight module of claim 1, wherein the elastic corner parts are adhered to the back frame through a double-sided adhesive tape or through snap-fitting connection.

8. The backlight module of claim 1, further comprising a reflective sheet located between the baseplate of the back frame and the light guide plate.

9. The backlight module of claim 1, further comprising a front frame and a cushion, wherein the front frame is located above the LCD panel and fixedly connected with the sidewalls of the back frame; and the cushion is located between the front frame and the LCD panel.

10. A backlight module, comprising a back frame and a light guide plate disposed in the back frame, wherein the backlight module further comprises elastic corner parts for locating the light guide plate, and the elastic corner parts are disposed at diagonal corners of the backlight module and sandwiched between the back frame and the light guide plate;

wherein the back frame comprises a baseplate and sidewalls; the light guide plate is located above the baseplate of the back frame; the elastic corner parts are made of a plastic material, a silica gel or a rubber material; each of the elastic corner parts comprises two sidewalls perpendicular to each other; outer surfaces of the two sidewalls abut on the sidewalls of the back frame; a supporting plate extends inwards perpendicularly from a middle portion of an inner surface of each of the two sidewalls to divide the inner surfaces of the two sidewalls into an upper layer and a lower layer; the inner surfaces of the lower layer abut on a side surface of the light guide plate; and a lower surface of the supporting plate abuts on an upper surface of the light guide plate.

11. The backlight module of claim 10, further comprising an LCD panel supported on an upper surface of the supporting plate, wherein the inner surfaces of the upper layer form a stopping surface for locating the LCD panel.

12. The backlight module of claim 10, further comprising an optical film located above the light guide plate, wherein the supporting plate is in an L-shape having four continuous outer end surfaces, two of the outer end surfaces in the middle are perpendicular to each other to form an L-shaped snap-fit groove and two of the outer end surfaces near the edge are perpendicular to each other, and any two of the outer end surfaces perpendicular to each other serve to locate corresponding corners of the optical film.

13. The backlight module of claim 10, wherein the number of the elastic corner parts is four, and the four elastic corner parts are disposed at four diagonal corners of the backlight module symmetrically.

14. The backlight module of claim 13, further comprising an LED lamp strip, wherein side surfaces of the light guide plate comprises a light incident side and a non-light-incident side, a light emitting surface of the LED lamp strip is disposed opposite to the light incident side of the light guide plate; a hardness of the elastic corner part corresponding to the light incident side is greater than a hardness of the elastic corner parts corresponding to the non-light-incident sides; and the upper surface of the light guide plate is a light exiting surface.

15. The backlight module of claim 14, further comprising a reflective sheet located between the baseplate of the back frame and the light guide plate.

16. The backlight module of claim 15, further comprising a front frame and a cushion, wherein the front frame is located above the LCD panel and fixedly connected with the sidewalls of the back frame; and the cushion is located between the front frame and the LCD panel.

17. An LCD, comprising a backlight module, wherein the backlight module comprises a back frame, a light guide plate disposed in the back frame and elastic corner parts for locating the light guide plate, and the elastic corner parts are disposed at diagonal corners of the backlight module and sandwiched between the back frame and the light guide plate;

wherein the back frame comprises a baseplate and sidewalls; the light guide plate is located above the baseplate of the back frame; the elastic corner parts are made of a plastic material, a silica gel or a rubber material; each of the elastic corner parts comprises two sidewalls perpendicular to each other; outer surfaces of the two sidewalls abut on the sidewalls of the back frame; a supporting plate extends inwards perpendicularly from a middle portion of an inner surface of each of the two sidewalls to divide the inner surfaces of the two sidewalls into an upper layer and a lower layer; the inner surfaces of the lower layer abut on a side surface of the light guide plate; and a lower surface of the supporting plate abuts on an upper surface of the light guide plate.

* * * * *